US008519928B2

(12) United States Patent
Jiang et al.

(10) Patent No.: US 8,519,928 B2
(45) Date of Patent: Aug. 27, 2013

(54) METHOD AND SYSTEM FOR FRAME INSERTION IN A DIGITAL DISPLAY SYSTEM

(75) Inventors: Jiande Jiang, San Jose, CA (US); Walter C. Lin, San Jose, CA (US)

(73) Assignee: Entropic Communications, Inc., San Diego, CA (US)

( * ) Notice: Subject to any disclaimer, the term of this patent is extended or adjusted under 35 U.S.C. 154(b) by 618 days.

(21) Appl. No.: 11/472,588

(22) Filed: Jun. 22, 2006

(65) Prior Publication Data

US 2007/0296655 A1 Dec. 27, 2007

(51) Int. Cl.
*G09G 3/36* (2006.01)
*H04N 5/16* (2006.01)

(52) U.S. Cl.
USPC .............................. 345/89; 345/545; 348/697

(58) Field of Classification Search
USPC ...................... 345/87, 474, 545, 89; 348/697
See application file for complete search history.

(56) References Cited

U.S. PATENT DOCUMENTS 5,072,293 A 12/1991 De Haan et al.
5,148,269 A 9/1992 de Haan et al.
5,386,248 A 1/1995 De Haan et al.
5,495,300 A 2/1996 De Haan et al.
6,172,712 B1 1/2001 Beard
2002/0057238 A1* 5/2002 Nitta et al. ...................... 345/87
2005/0060421 A1 3/2005 Musunuri et al.
2006/0044241 A1 3/2006 Yuh-Ren et al.
2006/0044472 A1* 3/2006 Lee et al. ...................... 348/607
2006/0119617 A1* 6/2006 Toyooka et al. .............. 345/619

OTHER PUBLICATIONS

PCT Search Report and Written Opinion dated Mar. 17, 2008 corresponding to the related PCT Patent Application No. US2007/14256.

* cited by examiner

*Primary Examiner* — Jonathan Boyd
(74) *Attorney, Agent, or Firm* — Bruce Greenhaus; Richard Bachand; Duane Morris LLP

(57) ABSTRACT

A method and system for frame insertion in a digital display system is provided. The method is adapted for use with a liquid crystal display (LCD) type display and is effective to substantially reduce motion blur. The LCD display receives a sequence of digitized input frames at a first frequency. The method generates a sequence of output frames that include the digitized input frames interspersed with a plurality of modified frames. Each of the modified frames is substantially similar to a preceding digitized input frame, but has a reduced luminance. The modified frames may be generated by multiplying a preceding digitized input frame by a reduced luminance factor. The reduced luminance factor may be determined as a fixed value or as a function of an average pixel level of a preceding frame.

21 Claims, 3 Drawing Sheets

| | | | | | | | | | |
|---|---|---|---|---|---|---|---|---|---|
| Input Sequence (50/60 Hz): | A | | B | | C | | D | | ... |
| Output Sequence (100/120 Hz): | A | a*A | B | a*B | C | a*C | D | a*D | ... |

| | | | | | | | | | |
|---|---|---|---|---|---|---|---|---|---|
| Input Sequence (50/60 Hz): | A | | B | | C | | D | | … |
| Output Sequence (100/120 Hz): | A | A' | B | B' | C | C' | D | D' | … |

(PRIOR ART)

FIGURE 1

| | | | | | | | | | |
|---|---|---|---|---|---|---|---|---|---|
| Input Sequence (50/60 Hz): | A | | B | | C | | D | | … |
| Output Sequence (100/120 Hz): | A | X | B | X | C | X | D | X | … |

(PRIOR ART)

FIGURE 2

| | | | | | | | | | |
|---|---|---|---|---|---|---|---|---|---|
| Input Sequence (50/60 Hz): | A | | B | | C | | D | | … |
| Output Sequence (100/120 Hz): | A | a*A | B | a*B | C | a*C | D | a*D | … |

FIGURE 3

METHOD AND SYSTEM FOR FRAME INSERTION IN A DIGITAL DISPLAY SYSTEM

FIELD OF THE INVENTION

The present invention generally relates to digital display systems, and more particularly to a method and system for frame insertion in a digital display system that substantially eliminates or reduces motion blur.

BACKGROUND OF THE INVENTION

Digital display systems, such as liquid crystal display (LCD) monitors and televisions, typically receive analog signals from a video source arid convert the analog signals into a digital image. One problem associated with LCD monitors is motion blur, which is the visible distortion of a moving image displayed by the monitor. Motion blur is caused by the relatively slow response time of the liquid crystal elements that make up LCD monitors and the sample and hold characteristic of LCD technology.

Manufacturers have implemented various methods to reduce the motion blur problem. Current methods utilize a double scan approach. In a double scan LCD monitor, the frequency of input video (e.g., N (for example, 50/60 Hz video) is doubled (e.g., converted to N*2 (for example, 100/120 Hz) on the LCD monitor. How to convert the input at frequency N to output at frequency N*2 is thus a challenge for the video controller. One method uses motion estimation and motion compensation (MEMC) to predict where an object will be located in an intermediate frame. Particularly, based on the direction of motion, MEMC will predict object location and generate the intermediate frame as an interpolated frame with the moving object located in the predicted location. FIG. 1 illustrates how this method operates in conjunction with an N (e.g., 50/60) Hz input sequence of frames A, B, C, D . . . , and an N*2 (e.g., 100/120) Hz sequence of output frames. In this example, the output sequence would be A, A', B, B', C, C', D, D' . . . . The frames A, B, C and D represent the digitized input frames. The frames A', B', C' and D' represent the interpolated frames, which may include moving objects positioned in locations predicted using MEMC. Because the algorithms required for interpolation using MEMC are relatively complex, this method demands a substantial amount of processing resources to operate correctly. Furthermore, MEMC does not always provide an accurate prediction of object location and thus, there are many cases where MEMC will fail. If the MEMC fails, artifacts may be generated on the output frame, resulting in annoying noise for the viewer. Moreover, MEMC requires a significant amount of logic and memory to implement, and is very expensive.

Another method used to reduce motion blur inserts frames between active frames. The black frames act similar to shutter elements to reduce motion blur effects on the viewer. Particularly, the black screens serve to substantially eliminate or reduce the visual overlap that would otherwise be caused by the sample and hold feature of LCD monitors. FIG. 2 illustrates how this method operates in conjunction with an N (e.g., 50/60) Hz input sequence of frames A, B, C, D . . . , and an N*2 (e.g., 100/120) Hz sequence of output frames. In this example, the output sequence would be A, X, B, X, C, X, D, X . . . , where X represents a black frame. One drawback with this method is that the overall brightness of the display may be adversely affected.

Therefore, it would be desirable to provide an improved system and method for frame insertion within a digital display system that reduces motion blur.

SUMMARY OF THE INVENTION

In one embodiment, the present invention provides a method for frame insertion in a digital display system. The method is adapted for use with a liquid crystal display (LCD) type display and is effective to substantially reduce motion blur. The method includes receiving a sequence of digitized input frames at a first frequency; and generating a sequence of output frames wherein the sequence of output frames includes the digitized input frames interspersed with a plurality of modified frames, each modified frame being substantially similar to a preceding digitized input frame, but having a reduced luminance. In another embodiment, the modified frames are determined by multiplying a preceding digitized input frame by a reduced luminance factor. The reduced luminance factor may be determined as a fixed value or as an adaptive value (e.g., as a function of an average pixel level of a preceding frame).

In another embodiment of the present invention, a method for frame insertion in an LCD system is provided. The LCD system receives a sequence of input frames at a first frequency and generates a sequence of digital output frames at a second frequency. The method includes reading a plurality of digitized input frames from the frame buffer at a second frequency; generating a plurality of modified frames that are substantially similar to the plurality of digitized input frames with reduced luminance; and displaying the digitized input frames and modified frames as an interspersed sequence wherein each digitized input frame is followed by a modified frame. In other embodiments, the method may also include detecting an average pixel level value for each digitized input frame, and determining a corresponding reduced luminance factor as a function of the average pixel level value of the digitized input frame.

In another embodiment of the present invention, a system for frame insertion in an LCD system is provided. The LCD system receives input frames from a video source at a first frequency, digitizes the input frames and stores the digitized input frames in a frame buffer. The system for frame insertion includes first circuitry that reads a plurality of digitized input frames from the frame buffer at a second frequency; second circuitry that generates a plurality of modified frames, which are substantially similar to the plurality of digitized input frames, but having reduced luminance; and output circuitry coupled to the first circuitry and second circuitry. The output circuitry outputs a sequence of frames at the second frequency, including the plurality of digitized input frames interspersed with the plurality of modified frames.

In another embodiment of the present invention, an LCD system is provided. The LCD system includes an LCD monitor that receives a sequence of input frames from a video source at a first frequency, digitizes the input frames and stores the digitized input frames in a frame buffer; first circuitry that reads a plurality of digitized input frames from the frame buffer at a second frequency; second circuitry that generates a plurality of modified frames, which are substantially similar to the plurality of digitized input frames, but having reduced luminance; and output circuitry coupled to the first circuitry and second circuitry. The output circuitry outputs a sequence of frames, including the plurality of digitized input frames interspersed with the plurality of modified frames.

These and other features and advantages of the invention will become apparent by reference to the following specification and by reference to the following drawings.

BRIEF DESCRIPTION OF THE DRAWINGS

FIG. 1 illustrates a sequence of frames generated using a method for frame insertion that implements motion estimation and motion compensation, according to the prior art.

FIG. 2 illustrates a sequence of frames generated using a method for frame insertion that implements black frames in a digital display system, according to the prior art.

FIG. 3 illustrates an exemplary method for frame insertion in a digital display system, according to one embodiment of the present invention.

DETAILED DESCRIPTION OF THE EMBODIMENTS

Figure 4:
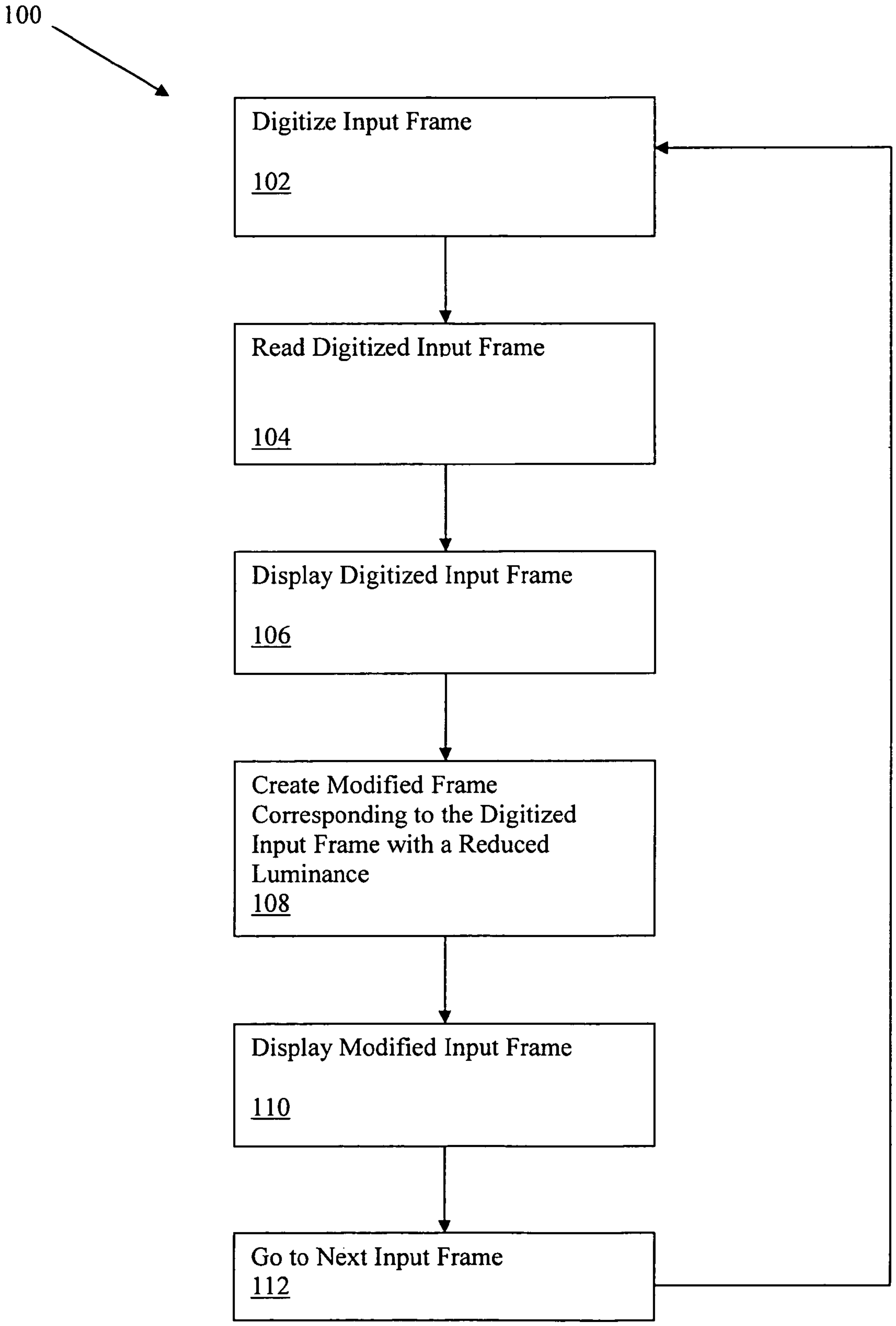
FIG. 4 illustrates a method for implementing frame insertion in a digital display system, according to one embodiment of the present invention.

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

In one embodiment of the present invention, a method for frame insertion is used to generate frames in a digital display system, such as an LCD monitor. The method reduces motion blur with a limited sacrifice to the overall brightness of the digital display. The method involves generating "modified" frames, which are each based on a previous input frame multiplied by a reduced luminance factor, and interspersing the modified frames with the input frames to create a sequence of output frames.

FIG. 3 illustrates a sequence of output frames generated using the method according to this embodiment. In one embodiment, the method may be designed to operate on an LCD monitor that implements a double scan approach. However, the method may also be implemented on other types of monitors using other types of scanning methods. In a double scan LCD monitor, the frequency of input video (e.g., N, for example, 50/60 Hz video) is doubled (e.g., converted to N*2, for example, 100/120 Hz) on the LCD monitor. As shown in FIG. 3, the input frames are illustrated as A, B, C, D . . . . Due to the double-scan nature of the monitor, the output frames generated will include twice as many frames, which will be output at twice the frequency of the input sequence. According to this embodiment, the output sequence is A, a*A, B, a*B, C, a*C, D, a*D . . . . The frames A, B, C and D represent the digitized input frames. Interspersed between the digitized input frames are modified frames a*A, a*B, a*C and a*D, which represent the inserted frames. The inserted frames are substantially similar to the digitized input frames, but have a reduced luminance. For example, each modified frame may be equal to the preceding digitized input frame multiplied by a reduce luminance factor "a". The reduced luminance factor can be a constant value or an adaptive variable representing some percentage less than or equal to 100%. In one embodiment, the reduced luminance factor may vary be between 0 and 1. The reduced luminance factor may also be calculated as a function of the average picture level or "APL" of the corresponding frame A, B, C, D. In this embodiment, the method determines an APL for each frame A, B, C, and D using conventional methods known to those of ordinary skill in the art. The method then calculates the reduced luminance factor "a" as a function of this APL for each frame. For example, the factor "a" for frame a*A would be equal to $f(APL_{Frame\ A})$, the factor "a" for frame a*B be would be equal to $f(APL_{Frame\ B})$, and so forth. In this manner, frames with higher APLs may have corresponding modified frames with higher luminance levels. In one embodiment, the factor "a" is proportional to the APL. The foregoing method provides an output sequence of frames that substantially reduces or eliminates the motion blur problem without significantly affecting the overall brightness of the display.

Because the foregoing method does not require complex algorithms for interpolation using MEMC, it can be implemented relatively easily without excessive dedicated processing resources. Furthermore, because the method does not insert black frames, the sacrifice to the overall brightness of the display is significantly reduced.

FIG. 4 illustrates a process of implementing frame insertion in a digital display system, according an embodiment of the present invention. While this embodiment is primarily described in relation to a method 100, it should be appreciated that each of the portions or blocks illustrated in FIG. 1 may represent logic blocks that may be implemented using conventional hardware, software, or firmware and/or any combination of hardware, software and firmware.

Method 100 may be implemented on a digital display system, such as an LCD display, which receives a sequence of input frames from a video source at a first frequency and outputs digitized frames at a second frequency, which may be double the first frequency. In one example, the input frequency is N (for example, 50/60 Hz) and output frequency is N*2 (for example, 100/120 Hz). In step 102, an input frame is received and digitized. The digitized frame may be stored in a frame buffer or memory. In step 104, the digitized input frame is read from the frame buffer or memory. In step 106, the method displays the digitized input frame on the LCD display. In step 108, the method generates a modified frame for insertion. The modified frame may be substantially similar to the digitized input frame, but having a reduced luminance. In one embodiment, the modified frame is equal to the digitized input frame multiplied by a reduced luminance factor "a" (e.g., the luminance value for each pixel of the frame may be multiplied by the reduced factor "a"). The reduced luminance factor "a" may be a constant value or may be variable (e.g., adaptive). For example, the reduced luminance factor "a" may be calculated as a function of the APL of the preceding input frame as previously described. In step 110, the method displays the modified frame. And in step 112, the method proceeds to the next input frame and repeats. In this manner, the method 100 generates a sequence of output frames that comprise the digitized input frames interspersed with modified frames of reduced luminance. One skilled in the art will appreciate that the each of the steps 102 through 112 do not have to occur in the sequence illustrated in FIG. 4. Certain steps may be occurring simultaneously and/or in a different order. For example, step 108 may occur before and/or during step 106. Additionally, those skilled in the art will appreciate that the digitized input frames and/or modified frames may undergo conventional filtering and processing before display.

Figure 5:
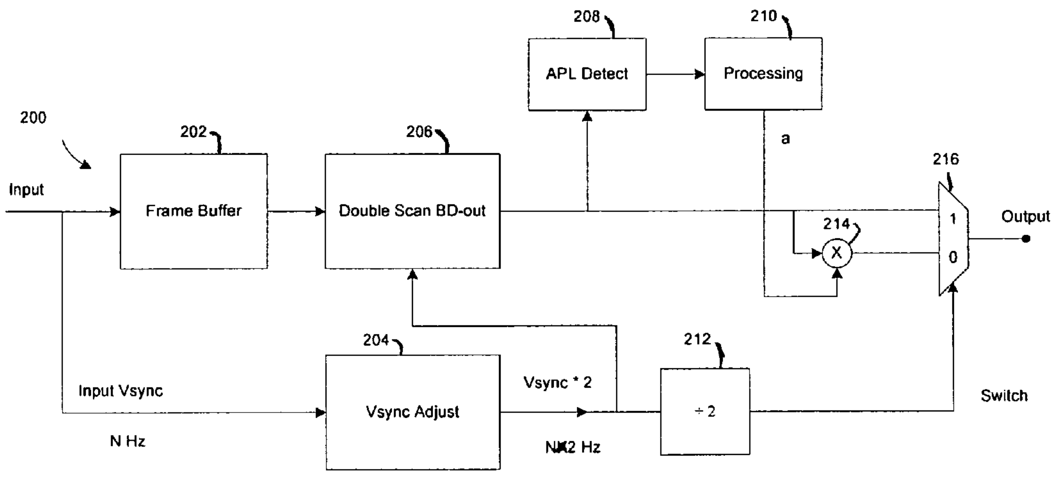
FIG. 5 illustrates a system for frame insertion in a digital display system, according to another embodiment of the present invention.

FIG. 5 illustrates one embodiment of a system 200 that may be used to implement the present invention in a digital television system. In one embodiment, portions of system 200 may reside within or comprise a display controller for a LCD monitor. The circuitry shown in FIG. 5 may be formed from conventional hardware elements (e.g., circuits), software elements, firmware elements and/or any combination thereof. In one embodiment, system 200 includes a frame buffer 202, a vertical sync signal adjustment module or circuit 204, a double scan read-out module or circuit 206, an average pixel level ("APL") detection module or circuit 208, a processing module or circuit 210, a divider circuit 212, a multiplier circuit 214, and an output multiplexer 216. The frame buffer 202 is coupled to the double scan read-out module 206, which selectively reads frames out of the buffer 202. The double scan read-out module 206 is coupled to and receives an adjusted vertical sync signal ("VSYNC*2") from vertical sync adjustment module 204. The output of vertical sync adjustment module 204 is also coupled to divider circuit 212, which is coupled to and provides the switching signal ("SWITCH") for multiplexer 216. The output of module 206 is coupled to APL detection module 208, to multiplier circuit 214 and to a first input of multiplexer 216. The APL detection module 208 is coupled to the processing module 210, which is coupled to multiplier circuit 214. The output of multiplier circuit 214 is coupled to a second input of multiplexer 216. The output of multiplexer 216 may be communicated to a LCD monitor for display. It should be appreciated that the system 200 shown in FIG. 5 may also include additional or different circuits or modules. Only those elements useful for an understanding of the invention have been depicted and described. Additionally, those skilled in the art will appreciate that the digitized input frames and/or modified frames may be filtered and processed by conventional filtering and processing circuitry before display.

Figure 6:
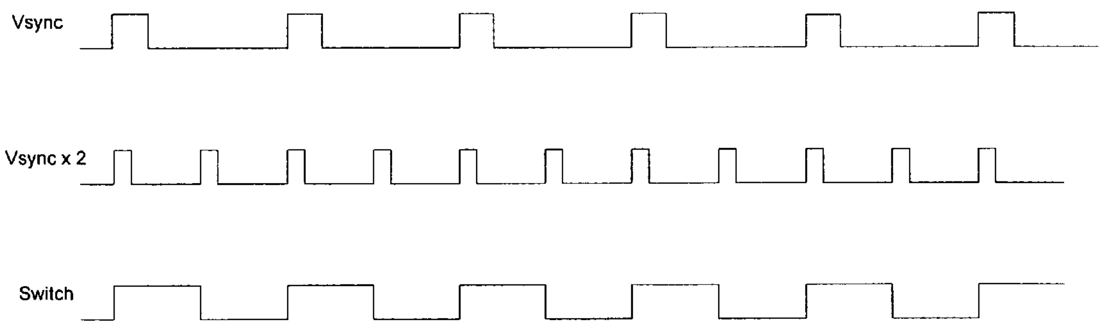
FIG. 6 illustrates an exemplary signal timing diagram for the system of FIG. 5.

The following discussion describes the operation of the system 200 and its components. In operation, the system 200 receives an input sequence of frames from a video source at a first frequency (e.g., N, for example, 50/60 Hz) and generates a sequence of output frames at a second frequency, which may be double the first frequency. The output frames include digitized versions of the input frames interspersed with modified frames, which are substantially equivalent to the input frames multiplied by a reduced luminance factor "a". Frame buffer 202 stores the digitized input frames in the sequence (e.g., frames A, B, C, D, etc., shown in FIG. 3). Vertical sync adjustment module 204 receives the vertical sync signal from the input sequence (i.e., VSYNC), which is set to a first frequency. In one embodiment, the first frequency may be N (for example, 50-60 Hz). In other embodiments, any suitable input frequency may be used. The vertical sync adjustment module 204, which may be a portion of the display controller, doubles the frequency of the vertical sync signal to generate an output signal "VSYNC*2" (for example, at 100-120 Hz). This output signal is communicated to the double scan read-out module 206 and to the divider circuit 212. The divider circuit 212 generates a switching signal (SWITCH) that switches value (from 0 to 1) upon detecting a rising edge of an input pulse. FIG. 6 illustrates exemplary wave forms for the input VSYNC signal, VSYNC*2 and SWITCH. At each pulse of VSYNC*2, read-out module 206 reads a frame from the frame buffer 202. Because the frame buffer 202 is receiving frames at the first frequency and the module 206 is reading frames out of the frame buffer at twice the speed, the module reads each frame in the frame buffer 202 twice (e.g., A, A, B, B, C, C, D, D, etc.). Each digitized frame is output to a first input of the multiplexer 216 and to the multiplication circuit 214. The APL detection block 208 uses conventional APL detection methods to determine the average pixel level of each frame, which represents the average brightness or luminance of each frame. The processing block 210 uses the APL value to calculate a reduced luminance factor "a". In one embodiment, the reduced luminance factor is proportional to the APL. The reduced luminance factor "a" is output to the multiplier block 214. The multiplier block 214 multiplies the luminance factor "a" with the current frame to generate a modified frame of reduced luminance (e.g., a*A, b*B, c*C, a*D, etc.), which is communicated to the second input of the multiplexer 216. The SWITCH signal causes multiplexer 216 to selectively switch its output between the first input to the second input, thereby selectively alternating between a digitized input frame and a corresponding modified frame. The resulting output would be similar to that shown in FIG. 3, namely, A, a*A, B, a*B, C, a*C, D, a*D, etc.

From the foregoing, it should be apparent that the embodiments disclosed provide improved methods and systems for frame insertion in a digital display system, such as an LCD monitor. The methods and systems reduce motion blur without requiring complex MEMC processing and with reduced sacrifice to the overall brightness of the monitor.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for frame insertion in a digital display system, comprising:

receiving a sequence of digitized input frames at a first frequency; and creating modified frames, each of the modified frames being substantially similar to a preceding digitized input frame with reduced luminance;

generating a sequence of output frames, wherein the sequence of output frames comprises the digitized input frames interspersed with a plurality of the modified frames;

wherein each modified frame of the plurality of modified frames comprises a preceding digitized input frame multiplied by a variable value reduced luminance factor, the reduced luminance factor being an adaptive value that is calculated as a function of the average pixel level of the preceding digitized input frame, which thereby provides an output sequence of frames having reduced motion, blur problems without affecting overall brightness.

2. The method of claim 1 wherein the digital display system comprises an LCD monitor.

3. The method of claim 1 further comprising:

detecting an average pixel level of the preceding digitized. input frame; and determining a value for the reduced luminance factor as a function of the average pixel level of the preceding digitized input frame.

4. The method of claim 3 wherein the reduced luminance factor is proportional to the average pixel level.

5. The method of claim 1 wherein the first frequency is N and the second frequency is N*2.

6. The method of claim 5 wherein the first frequency is about 50-60 Hz and the second frequency is about 100-120 Hz.

7. A method for displaying frames in an LCD display system that receives a sequence of input frames from a video source at a first frequency, digitizes the input frames and stores the digitized input frames in a frame buffer, comprising:

reading a plurality of digitized input frames from the frame buffer at .a second frequency;

generating a plurality of modified frames that are substantially similar to the plurality of digitized input frames with reduced luminance; and displaying the digitized input frames and modified frames as an interspersed sequence, wherein each digitized input frame is followed by, a modified frame;

wherein each modified frame of the plurality of modified frames comprises a preceding digitized input frame multiplied by a variable value reduced luminance factor, the reduced luminance factor being an adaptive value that is calculated as a function of the average pixel level of the preceding digitized input frame, which thereby provides an output sequence of frames having reduced motion blur problems without affecting overall brightness.

8. The method of claim 7 further comprising:

detecting an average pixel level of the preceding digitized input frame;

determining a value for the reduced luminance factor as a function of the average pixel level of the preceding digitized input frame.

9. The method of claim 8 wherein the reduced luminance factor is proportional to the average pixel level.

10. The method of claim 1 wherein the first frequency is N and the second frequency is N*2;

11. The method of claim 10 wherein the first frequency is about 50-60 Hz and the second frequency is about 100-120 Hz.

12. A system for frame insertion in an LCD monitor that receives input frames, from a video source at a first frequency, digitizes the input frames and stores the digitized input frames in a frame buffer, comprising:

first circuitry that reads a plurality of digitized input frames from the frame butler at a second frequency;

second circuitry that generates a plurality of modified frames, which are substantially similar to the plurality of digitized input frames, but having reduced luminance; and means coupled to the first circuitry and second circuitry; for outputting a sequence of frames, the sequence of frames comprising the plurality of digitized input frames interspersed with the plurality of modified frames;

wherein the second circuitry generates the plurality of modified frames by multiplying the digitized input frames by at least one same constant value reduced luminance factor, wherein each modified frame is associated with a corresponding reduced luminance factor and each of the corresponding reduced luminance factors is a constant for each pixel of the associated modified frame.

13. The system of claim 12 further comprising:

third circuitry that calculates the a reduced luminance factor for each digitized input frame; and wherein the second circuitry generates each modified frame by multiplying a preceding digitized input frame by its corresponding reduced luminance factor.

14. The system of claim 13 wherein the third circuitry calculates the reduced luminance factor for a digitized input frame as a function of the average pixel level of the digitized input frame.

15. The system of claim 12 wherein the first circuitry comprises a double scan read-out module, which is coupled to the frame buffer.

16. The, system of claim 12 wherein the second frequency is double the first frequency.

17. An LCD system comprising:

an LCD monitor that receives a sequence of input frames from a video source at a first frequency, digitizes the input frames and stores the digitized input frames in a frame buffer;

first circuitry that reads a plurality of digitized input frames from the frame buffer at a second frequency;

second circuitry that generates a plurality of modified frames, which are substantially similar to the plurality of digitized input frames with reduced luminance; and means coupled to the first circuitry and second circuitry, for outputting a sequence of frames, the sequence of frames comprising the plurality of digitized input frames interspersed with the plurality of modified frames;

wherein the second circuitry generates the plurality of modified frames by multiplying each individual frame of the digitized input frames by a variable value reduced luminance factor, the reduced luminance factor being an adaptive value that is calculated as a function of the average pixel level of the preceding digitized input frame, which thereby provides an output sequence of frames having reduced motion blur problems without affecting overall brightness.

18. The LCD system of claim 17 further comprising:

third circuitry that calculates the a reduced luminance factor for each digitized input frame; and wherein the second circuitry generates each Modified frame by multiplying a preceding digitized input frame by its corresponding reduced luminance factor.

19. The system of claim 18 wherein the third circuitry calculates the reduced luminance factor for a digitized input frame as a function of the average pixel level of the digitized input frame.

20. The system of claim 17 wherein the first circuitry comprises a double scan read-out module, which is coupled the frame buffer.

21. The system of claim 17 wherein the second frequency is double the first frequency.

* * * * *